(12) United States Patent
Chi et al.

(10) Patent No.: US 10,364,548 B2
(45) Date of Patent: *Jul. 30, 2019

(54) METHOD OF OPTIMIZING PERFORMANCE OF MACHINES AT A WORKSITE

(71) Applicant: Caterpillar Inc., Peoria, IL (US)

(72) Inventors: Liqun Chi, Peoria, IL (US); Sanat A. Talmaki, Watertown, MA (US); Paul T. Corcoran, Washington, IL (US); Scott A. Leman, Eureka, IL (US); Brad L. Holsapple, Metamora, IL (US); Mark W. Whiting, Peru, IL (US); Allen J. DeClerk, Princeton, IL (US)

(73) Assignee: Caterpillar Inc., Deerfield, IL (US)

( * ) Notice: Subject to any disclaimer, the term of this patent is extended or adjusted under 35 U.S.C. 154(b) by 71 days.

This patent is subject to a terminal disclaimer.

(21) Appl. No.: 15/722,414

(22) Filed: Oct. 2, 2017

(65) Prior Publication Data

US 2018/0044888 A1    Feb. 15, 2018

Related U.S. Application Data

(63) Continuation-in-part of application No. 15/143,985, filed on May 2, 2016, now Pat. No. 9,822,509.

(51) Int. Cl.
| | |
|---|---|
| *E02F 9/00* | (2006.01) |
| *E02F 9/20* | (2006.01) |
| *E02F 9/26* | (2006.01) |
| *G06F 17/00* | (2019.01) |
| *G05B 15/02* | (2006.01) |
| *G06F 3/00* | (2006.01) |
| *G06Q 10/00* | (2012.01) |

(Continued)

(52) U.S. Cl.
CPC ............ *E02F 9/2054* (2013.01); *E02F 9/262* (2013.01); *G05B 15/02* (2013.01); *G06F 3/0484* (2013.01); *G06F 16/2455* (2019.01); *G06Q 10/0631* (2013.01); *G06Q 50/08* (2013.01)

(58) Field of Classification Search
CPC ........ G06F 16/00; G06F 16/2455; G06F 3/00; G06F 3/0484; E02F 9/00; E02F 9/262; G05B 15/00; G05B 15/02; G06Q 10/00; G06Q 10/0631; G06Q 50/08
See application file for complete search history.

(56) References Cited

U.S. PATENT DOCUMENTS 8,306,836 B2 * 11/2012 Nichols ............ G06Q 10/06313
  705/7.11
9,822,509 B1 * 11/2017 Chi ..................... G06Q 10/0631

(Continued)

*Primary Examiner* — Yonel Beaulieu
(74) *Attorney, Agent, or Firm* — L. Glenn Waterfield

(57) ABSTRACT

A method of controlling machines for performing operations at a worksite is disclosed. The method includes receiving pre-construction terrain data, design terrain data, and resource data and then defining a plurality of constraints based on the data. Operations of the machines are simulated based on the data. The method includes estimating process variables associated with the operations and defining and scheduling tasks to be performed by the machines. The method includes collecting real time data from the worksite and updating the estimated process variables and the scheduled tasks of the machines based on the collected real time data. Instructions are then provided to the machines for executing the tasks.

20 Claims, 9 Drawing Sheets

(51) Int. Cl.
*G06Q 50/08* (2012.01)
*G06F 3/0484* (2013.01)
*G06F 16/2455* (2019.01)
*G06Q 10/06* (2012.01)

(56) References Cited

U.S. PATENT DOCUMENTS

| | | | | |
|---|---|---|---|---|
| 9,851,719 | B2* | 12/2017 | Stratton | G05D 1/0219 |
| 10,119,244 | B2* | 11/2018 | Elkins | B60W 30/10 |
| 2001/0027407 | A1* | 10/2001 | Mori | G06Q 10/06 |
| | | | | 705/7.12 |
| 2007/0179640 | A1* | 8/2007 | Moughler | E02F 9/2045 |
| | | | | 700/36 |
| 2013/0035978 | A1* | 2/2013 | Richardson | G06Q 10/087 |
| | | | | 705/7.27 |

\* cited by examiner

FIG. 5

| Route Name | Source | Destination | Machine System | Hauling Distance (m) | Volume (m^3) | Unit Cost ($) | Cost ($) | Hourly Productivity | Working Hours | Fuel Use (gal) |
|---|---|---|---|---|---|---|---|---|---|---|
| 19-20 | Station 19 | Station 20 | D8T Tier 4f | 20 | 217 | $0.0801 | $17.39 | 419.98 | 0.52 | 3.18 |
| 19-21 | Station 19 | Station 21 | D8T Tier 4f | 40 | 226 | $0.1345 | $30.46 | 250.19 | 0.92 | 5.58 |
| 26-24 | Station 26 | Station 24 | D8T Tier 4f | 40 | 1218 | $0.1377 | $167.79 | 244.83 | 4.98 | 30.77 |
| 26-25 | Station 26 | Station 25 | D8T Tier 4f | 20 | 458 | $0.0814 | $37.29 | 414.29 | 1.11 | 6.84 |
| 27-22 | Station 27 | Station 22 | 627K | 100 | 1330 | $0.1864 | $247.79 | 336.61 | 3.95 | 69.65 |
| 27-23 | Station 27 | Station 23 | 627K | 80 | 1675 | $0.1790 | $299.78 | 350.58 | 4.78 | 84.27 |
| 27-24 | Station 27 | Station 24 | 627K | 60 | 983 | $0.1691 | $166.14 | 371.04 | 2.65 | 46.70 |

METHOD OF OPTIMIZING PERFORMANCE OF MACHINES AT A WORKSITE

CROSS-REFERENCE TO RELATED APPLICATIONS

This application is a continuation-in-part of application Ser. No. 15/143,985, filed on May 2, 2016, now U.S. Pat. No. 9,822,509.

TECHNICAL FIELD

The present disclosure relates to machines and more particularly to a method of optimizing operations of the machines at a worksite.

BACKGROUND

Generally, earthmoving work at a worksite is carried out based on a planned profile prepared prior to execution of the construction work at the worksite. Further, during the execution of the construction work, a site profile of the construction work may be generated by monitoring the worksite using unmanned aerial systems. In conventional methods, the site profile is subtracted from the planned profile to analyze the construction work at the worksite. The planned profile may be prepared based on the amount of material to be transferred at the worksite, routes of the machine involved in the construction works and the distance to be travelled by the machine, which may not be helpful in anticipating desired cost, productivity, and a turn-around time associated with the construction work.

U.S Patent Publication Number 2013/0035978, hereinafter referred to as '978 publication discloses a computer implemented route determination system. The computer implemented route determination system includes a route generator, a cost scenario generator, and a report generator. The route generator is configured to define a plurality of routes on which move a material between a construction site and a destination site of a plurality of possible destination sites. The cost scenario generator is configured to determine cost scenarios associated with the plurality of routes. The report generator is configured to generate a report which identifies the routes and the cost scenarios for the destination site. However, the '978 publication does not disclose a method of controlling construction work at the worksite.

SUMMARY OF THE DISCLOSURE

A method of optimizing the performance of machines for performing operations at a worksite is disclosed. The method comprises receiving pre-construction terrain data, design terrain data, and resource data associated with the worksite. The method defines a plurality of constraints associated with the operations based on the data, simulates operations of the machines at the worksite based on the data, and estimates process variables associated with the operations. An optimized operational level task is provided to an operator. Real time data is then collected from the machines and process variables are updated. A performance indicator is provided to the operator based on the optimized task and real time data.

BRIEF DESCRIPTION OF THE DRAWINGS

FIG. 5 is an exemplary table representing process variables associated with the one or more operations;

DETAILED DESCRIPTION

Figure 1:
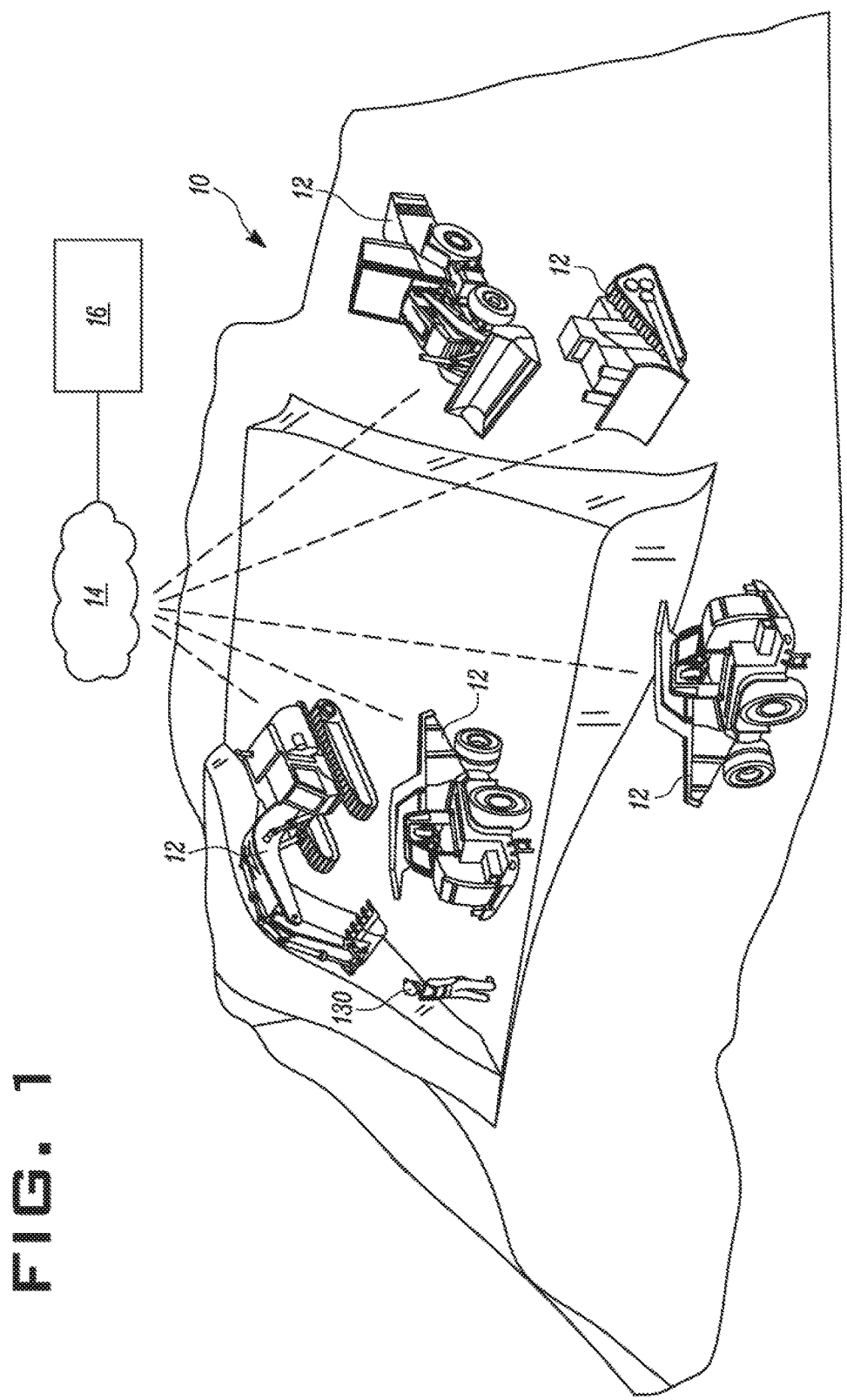
FIG. 1 is a diagrammatic view showing a worksite and one or more machines operating at the worksite, according to an embodiment of the present disclosure.

Wherever possible, the same reference numbers will be used throughout the drawings to refer to the same or the like parts. FIG. 1 is a diagrammatic view showing an exemplary worksite 10. The worksite 10 may be a construction site and/or a mining site. The worksite 10 includes one or more machines. The machines 12 may include mining trucks, haul trucks, on-highway trucks, off-highway trucks, articulated trucks, and any other machines used for performing earth moving operations at the worksite 10. The machines 12 may be deployed in the worksite 10 for performing one or more operations such as, transportation of material from one location to another location (i.e., hauling). The machines 12 also include loading machines, such as, conveyors, excavators, wheel loaders, track-type loaders, shovels, draglines, and any other machine used for performing excavation operations at the worksite 10. The one or more machines also include scrapers, track-type tractors, compactors, and motor graders to perform additional work site operations including dumping, spreading, compacting, site maintenance and upkeep, grading, etc. Therefore, the machines 12 can perform operations such as loading, hauling, dumping, filling, cutting, excavating, spreading, compacting, grading etc.

The machines 12 deployed at the worksite 10 may be communicated to each other and various systems via a communication medium 14. Examples of the communication medium 14 may include, but are not limited to, a Wide Area Network (WAN), a Local Area Network (LAN), an internet, an intranet, a cellular network, a satellite network, or any other known network for transmitting and receiving data. In various examples, the communication medium 14 may include a combination of two or more of the aforementioned networks and/or other types of networks known in the art. Further, the communication medium 14 may be implemented as a wired network, a wireless network, or a combination thereof. Further, data transmission may take place over the communication medium 14 with a network protocol such that the data transmission may be in an encrypted format or any other secure format, or in any of wide varieties of known manners. In one example, the one or more operations of the machines 12 are monitored using an unmanned aerial system (UAS) 140 (shown in FIG. 4). The UAS 140 may be controlled by a remote control unit (not shown). The unmanned aerial system collects data of the machines 12 deployed at the worksite 10.

The machines 12 are connected to a control system 16 via the communication medium 14 and the unmanned aerial system. The control system 16 could be located on any of the machines 12 at the worksite 10. The control system 16 is configured to perform earthmoving operations control and guidance. The control system 16 controls the one or more operations performed by the machines 12 at the worksite 10. The machines 12 may include hardware components and/or software components that enable sending informational and operational control data between the machines 12 and the control system 16, and between the machines 12. Moreover, an operator of the machine 12 controls one or more operation tasks performed by the machine 12 using the hardware components and/or software components for manned and remote control operation. Completion of one or more operations at the worksite 10 includes a planning phase and an execution phase of the one or more operations.

The control system 16 is implemented in the planning phase and the execution phase. In the planning phase, the one or more operations to be performed at the worksite 10 are planned by the control system 16. In the execution phase, the planning performed at the planning phase may be modified by a site supervisor or work director, and is updated by the control system 16. The hardware components and/or software components on board the machine may enhance task execution with additional application specific controls to improve operation. Constraints 160 may be weighted based on customer preferences inputted via a user interface module 150. The user interface module 150 may be a terminal, tablet, smart phone, touch display, and computer that is connected to portions of the control system 16 as is known in the art. For instance, one customer may prioritize cost while another customer may prioritize time. The control system 16 is explained in detail along with the planning and execution phase with reference to FIG. 2.

Figure 2:
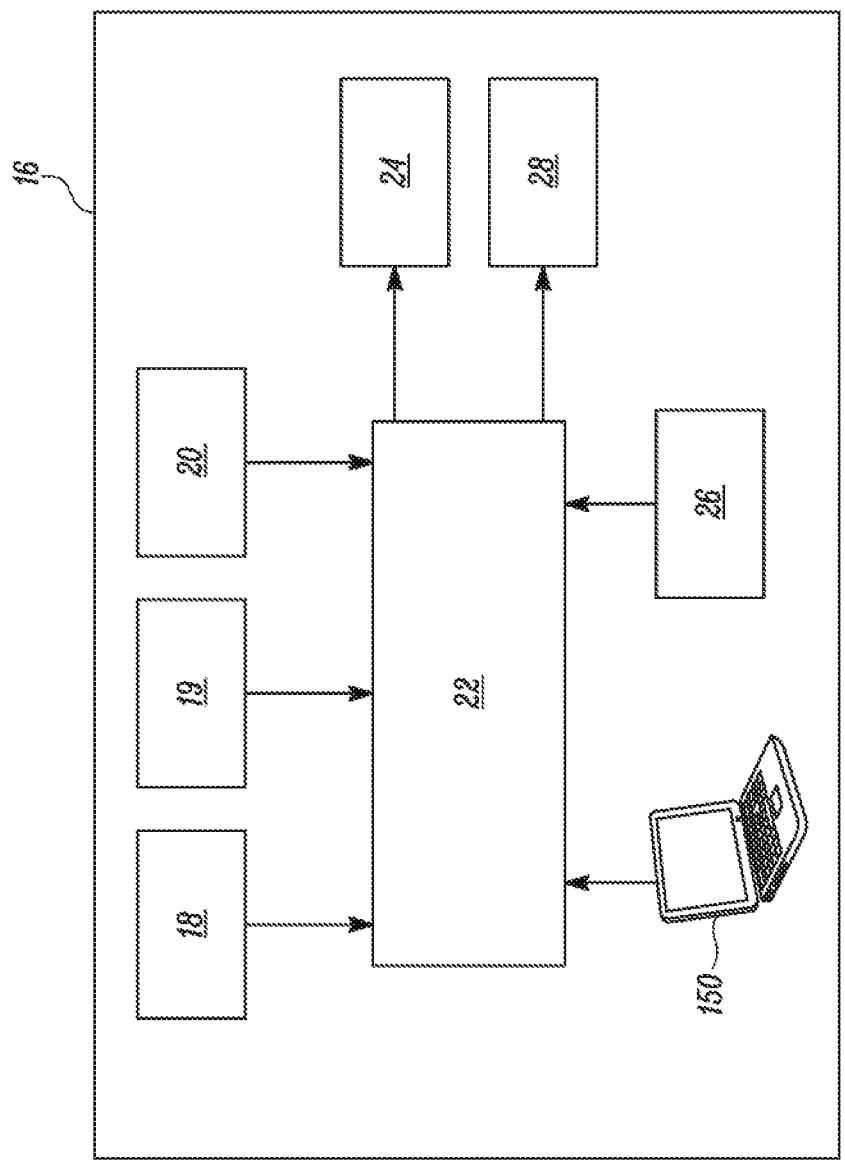
FIG. 2 is a schematic block diagram of a control system 16 for controlling one or more machines for performing one or more operations at the worksite of FIG. 1.

Referring to FIG. 2, a schematic block diagram of the control system 16 is disclosed. The control system 16 is communicably coupled to various databases and the user interface module 150. The control system 16 receives data from the databases and the user interface module 150. The data received by the control system 16 includes a pre-construction terrain data 100. The control system 16 receives the pre-construction terrain data 100 at a block 18. The data is related to the worksite 10. For example, the pre-construction terrain data 100 may be collected via a worksite survey. The pre-construction terrain data 100 may include two or three-dimensional surface and sub-surface data. The pre-construction terrain data 100 may be received from a database and/or the user interface module 150 connected to the control system 16. The user interface module 150 may have the Graphical User Interphase (GUI) for enabling the operator interaction with the user interface module 150.

Figure 4:
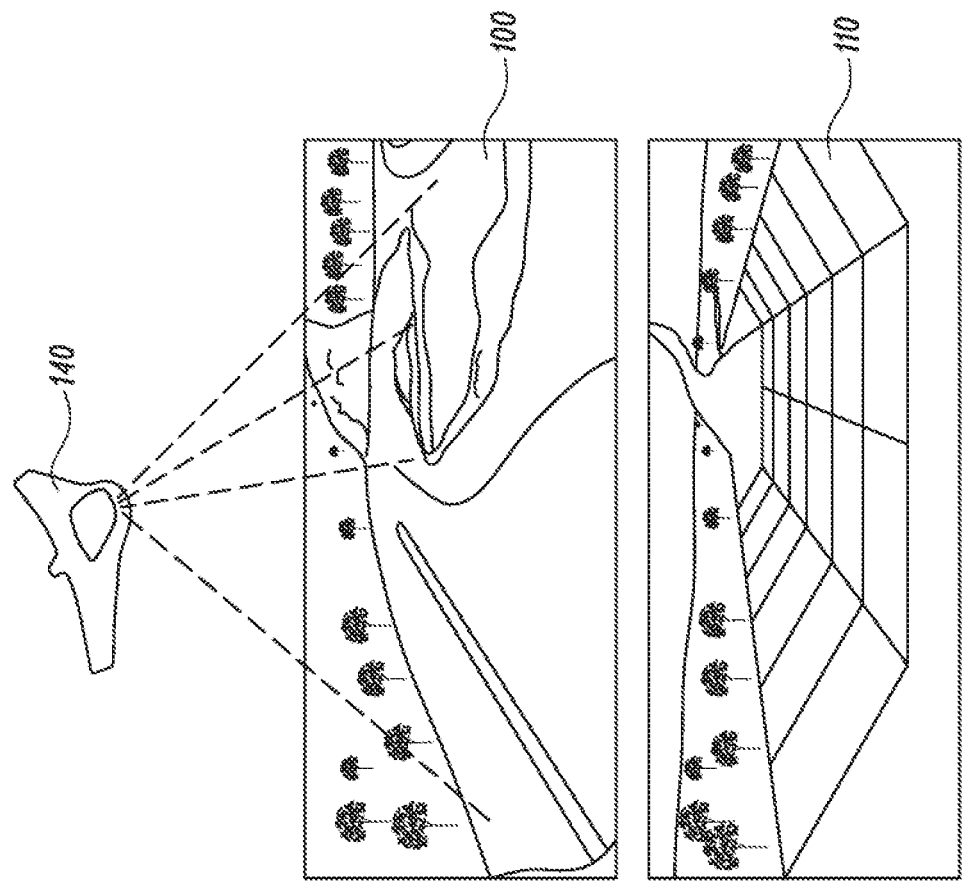
FIG. 4 is a 3D graphical representation of a pre-construction terrain model and a design terrain model.

FIG. 4 is a graphical representation of three dimensional pre-construction terrain data 100 juxtaposed with three dimensional design terrain data 110. The three dimensional pre-construction terrain data 100 and the three dimensional design terrain data 110 are hereinafter referred to as the pre-construction terrain data 100 and the design terrain data 110, respectively. The pre-construction terrain data 100 may be collected via a worksite survey from the UAS 140, satellite, or other aircraft. The difference between the pre-construction terrain data 100 and the design terrain data 110 defines a volume of material 180 to be moved at the worksite 10.

The pre-construction terrain data 100 also includes material information. The material information include, but is not limited to, information related to soil at the worksite 10, type of materials involved in the one or more operation, and a cost of materials involved in the one or more operation. In one example, the information related to the soil may include a proprietary soil data, a test methodology used to test soil, compaction of the soil, swell/shrink factors of the soil, and data from a public soil database. The pre-construction terrain data 100 may also include a location of the worksite 10, off-site locations for source and waste material, and predicted or historical weather data of the worksite 10. The pre-construction terrain data 100 can also include information regarding underground utilities, overhead utilities, structures, easements, and bodies of water.

At block 19, the control system 16 receives the design terrain data 110. The design terrain data 110 includes a three dimensional or two dimensional model of a design profile to be formed at the worksite 10, list of one or more operations to be performed at the worksite 10 to accomplish the design profile, impacts of the one or more operations to be performed at the worksite 10, schedule data (restrictions on hours of operation, and schedule deadlines and late completions cost penalties). In another aspect of the current disclosure, the design terrain data 110 could include a final road surface, a superstructure, footings, or any other build infrastructure to be included at the worksite 10.

At a block 20, the control system 16 receives resource data 120. The resource data 120 may include information associated with the machines 12. The resources data 120 could include the machines 12 or skilled labor 130, the UAS 140, or other robots. The resource data 120 may also include data regarding the cost of the skilled labor 130 and their associated skill level. The skilled labor 130 could include machine operators, laborers, inspectors, or surveyors. The resource data 120 may also include external materials that are added to the worksite 10 such as fill material, stabilizers, aggregate, etc.

The information associated with the machines 12 may include information of a fleet of the machines 12 available at the worksite 10 for performing the one or more operations. In one example, the information of the fleet of the machines 12 includes the number of machines 12 available at the worksite 10 and the type of the machines 12 available at the worksite 10. The information associated with the fleet may be received from the user interface module 150 in communication with the control system 16. In another example, the information associated with the fleet may be received from the database connected to the control system 16.

The resource data 120 further includes resource performance data. The resource performance data may include productivity and efficiency data associated with each of the machines 12 available in the fleet. The resource performance data may be collected from a manufacturer performance handbook or a database. In another example, the resource performance data may be collected from multiple productivity field tests conducted for each of the machines 12 or from historical operational data taken from previous work sites. Examples of information included in the resource data 120 are fuel consumption, payload, productivity, travel speed, cycle time, pass matching (how many times it takes a load operation to fill a hauling machine), dig depth, machine geometry, machine transport costs, generated noise, etc.

The control system 16 is implemented in the planning phase of one or more operations. At the planning phase, the control system 16 simulates the one or more operations to be performed at the worksite 10 at a block 22. In order to simulate the one or more operations, the control system 16 defines the constraints 160 associated with the worksite 10. The constraints 160 are defined based on the pre-construction terrain data 100, the design terrain data 110, and the resource data 120. In one example, the constraints 160 may include project budget, project schedule, and available resources (such as available machines 12 or skilled labor 130).

Further, the control system 16 simulates the one or more operations performed by the machines 12 at the worksite 10. A simulation is performed based on the pre-construction terrain data 100, the design terrain data 110, and the resource data 120. In one example, the simulation may consider information such as machine specific data, accurate terrain information of the worksite 10, and an order of the one or more operations of the machines 12 to be performed at the worksite 10. The simulation may be performed regarding the operations of the machines 12 required to move the volume of material 180. The order of the one or more operations may be defined using an earthwork planner as is known in the art, without limiting the scope of present disclosure.

At a block 24, the control system 16 estimates process variables 170 associated with the one or more operations. The process variables 170 are estimated based on the simulation of the one or more operations and the plurality of constraints 160. The control system 16 implements methods known in the art, such as linear and mixed integer linear programming, discrete event simulation, agent-based modeling, along with proprietary simulation techniques, for estimating the process variables 170 based on the constraints 160. The process variables 170 include tasks to be performed by the machines 12, the order in which they are to be performed, (i.e. task schedule), and the types and number of resources required to perform the tasks.

The control system 16 is also configured to help the site supervisor manage risk. Different machines have different sensitivity to weather and soil conditions. Uncertainty in weather and soil conditions can affect the task schedule and constraints 160. The user, such as a site supervisor, can be informed of deltas between peak and minimum productivity of an earth moving system. The control system 16 will allow the user to view the impact of using different earth moving systems with different constraints. For instance, the control system 16 could receive an input of a certain number of rain days expected during the project duration. A second input could be different soil conditions. The control system 16 would vary the probability of the inputs and provide and output of a risk profile 260 for meeting the task schedule and project schedule.

Figure 7:
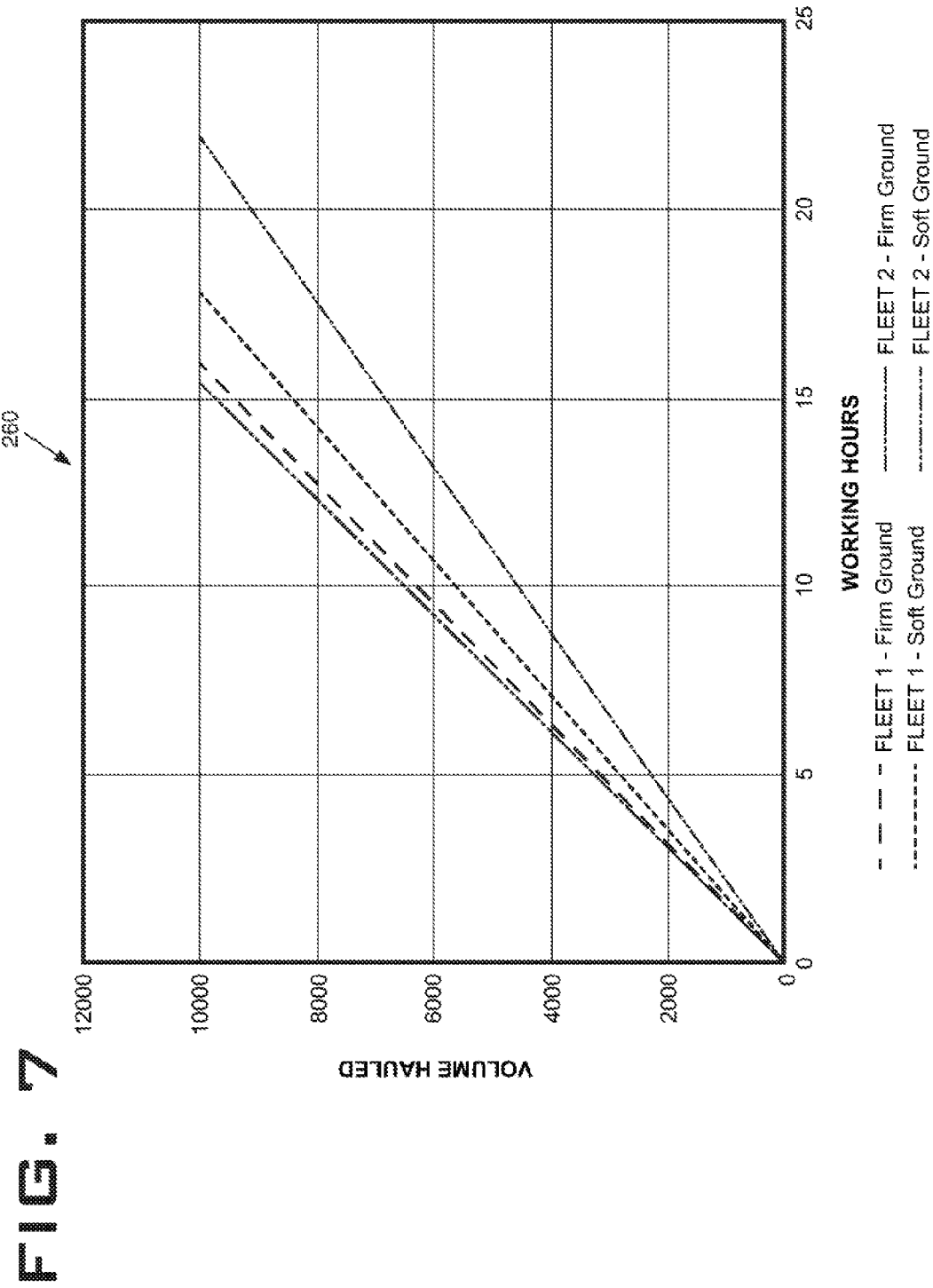
FIG. 7 is a chart showing a risk profile between two earth moving fleets.
Figure 8:
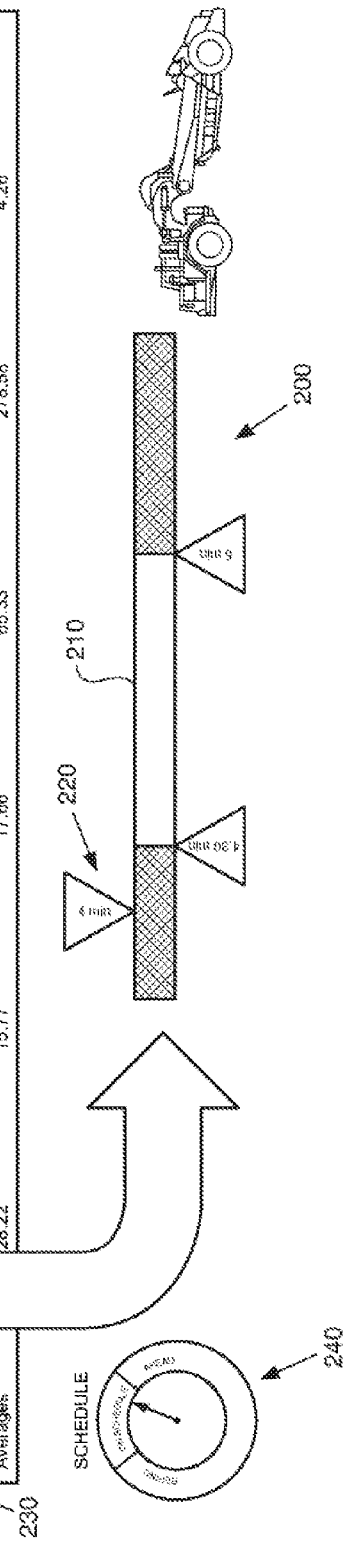
FIG. 8 is a representation of an optimized task and a performance indicator.

For example, refer to FIG. 7 which shows the simulated performance of two hypothetical fleets. Fleet 1 is an earth-moving system comprising a Caterpillar 349E HEX and four Caterpillar 735C articulated trucks. Fleet 2 comprises three Caterpillar 627K wheel tractor scrapers (WTS). As is shown in FIG. 7, in this situation Fleet 2 has a higher performance potential in good conditions. If soft ground conditions arise, either from unexpected weather or unexpected soil conditions, the performance of Fleet 2 falls below Fleet 1. The control system 16 can output a risk profile 260 via user interface module 150. Using this information, the site supervisor can choose to accept a higher or lower risk profile 260 in choosing the resources that will be used to complete the project.

At the block 24, the control system 16 schedules one or more tasks to be performed by the machines 12 at the worksite 10. The one or more tasks are scheduled based on the simulation of the one or more operations. Moreover, information such as, but is not limited to, the task to be implemented at the worksite 10, and a set of subsequent tasks to be performed. In one example, the simulation of the one or more operations generates a set of instructions for controlling the machines 12 deployed at the worksite 10. In one example, additional tasks are received from the user interface module 150. Tasks may be at an operational level (move to a location, perform a cut, dump at a location, establish a certain grade, etc.) or may be more detailed instructions for the machine 12 to execute (engine fueling to 40%, lift implement to a certain height, shift to a specific gear, follow a specific path, etc.).

There are at least six main categories of operations for a machine at a worksite: digging, hauling, loading, compaction, spreading, and grading.

In the context of machine operation, cycle time is defined as how long it takes a machine to perform a certain operation. For example, a cycle could be defined as how long it takes a loader to fill the bucket from a pile, dump into a truck, and return the bucket to the pile. Cycle times determine hourly productivity which in turn determines how much work gets done in a shift. It is important for a machine operator to understand the impact of individual cycle times in the overall task schedule and project schedule. In addition, cycle times can be broken down into smaller segments 230. Cycle segmentation is achieved by looking at detailed machine information to determine what the machine is doing at any one time (e.g. digging, roading, dumping, idling). Such machine data can be accessed from the machine's controller or the control area network (CAN). Machine information such as engine speed, engine load, fuel usage, hydraulic lift cylinder pressure and position, wheel speed, etc. can be useful for machine cycle segmentation. Providing an operator with performance targets for specific segments 230 of a cycle can give an operator actionable information regarding machine performance and its impact on the overall task schedule and project schedule. The control system 16 may also provide a project impact indicator 240 that will inform the operator of the impact of his/her segment or cycle performance on the overall task schedule and/or project schedule.

A site supervisor can be informed if performance of an individual operator or groups of operators (for example, an entire shift) will impact the task schedule or cause the project to fall outside the constraints. The site supervisor could be notified by user interface module 150, which could either be a portable device or located at a back office. The system can show cumulative productivity of the operator or a group of operators and can project the expected productivity by the end of the shift. The indicated productivity could be over or under a productivity target threshold. The control system can communicate alternatives to the supervisor for assigning additional machines if the expected productivity is below the productivity threshold, or reassigning machines if the expected productivity is above the productivity threshold. In this way the projection can be provided to the site supervisor with adequate time to act before cost or schedule are affected.

Following are some examples of operational level tasks 190 for some of the main categories of machine operations at a worksite.

A track-type tractor (TTT) is an example of a machine that performs digging operations. Operational level tasks 190 could include start cut location, target gear, cut depth, carry length, dump location, and a reverse point. A cycle time for digging could be all of the listed operational level tasks 190 or any sub-combination. A cycle time for digging could also be measured in cubic yards or meters.

A truck, such as an articulated truck (AT) or off-highway truck (OHT) is an example of a machine that performs hauling operations. Operational level tasks 190 could include navigating a route to a target spot such as a loading or dumping location. The route may be an optimal route. Other operational level tasks 190 could include where to queue in line with other trucks, truck spotting (backing to a precise target position), target speed, target gear, idling, time spent maneuvering around the loading and dumping area, and hauling. The hauling operation could be broken down into segments 230 such as load, travel loaded, dump, and return empty. The optimum range indicator 210 and the current performance indicator 220 could include the number of cycles per hour, which would indicate hourly productivity.

Loading can be accomplished by machines such as a hydraulic excavator (HEX), a shovel, or a wheel loader. Operational level tasks 190 for a HEX or shovel could include location for loading, height of bench (in the case of bench loading, e.g. bench should be the same height as the stick portion of the HEX), or a target spot for dumping. In some cases, a target spot for dumping may be communicated from the loader to the truck via machine-to-machine communication or over a local area network as is known in the art. Other tasks could include where to locate relative to the dig face and the truck. The HEX or shovel dig cycle time could be further broken down into dig/swing/dump segments 230 and a performance indicator 200 could be provided to the operator for each individual segment. Individual segment performance information would provide actionable information to the operator and would inform him/her of the segment impact on the task schedule and the project schedule.

Operational level tasks 190 for a wheel loader could include the target distance to the pile, the location of a directional shift and turn point, and a proper angle between the pile and hauling truck. For instance, an efficient loading cycle for a wheel loader might require the wheel loader is to reverse 1.5 tire rotations, then shift into forward towards the hauling truck. The bucket is raised during forward travel, dumps when in position over the truck, and then repeats the steps in reverse to complete the cycle. The loading cycle can be broken down into individual segments 230. Individual segment performance information would provide actionable information to the operator and would inform him/her of the segment impact on the task schedule and the project schedule.

Compaction is accomplished by such machines as pneumatic compactors, vibratory compactors, or sheep's foot compactors. Such machines typically travel a path back and forth along a specified route, compacting the soil to a specified level. A back and forth path forms a complete cycle. Operational level tasks 190 provided by the control system 16 could show number of cycles required for proper compaction or the orientation of the compaction route based on the direction of finish grading. A current performance indicator 220 could include a current compaction level in relation to an optimum range indicator for compaction. Compaction performance can be measured in several different ways. A first example, called machine driving power (MDP) uses real time measurement of the powertrain data during compaction and correlates the data to soil density. A second example, called compaction meter value, uses real time measurement of the dynamic vertical acceleration of a compactor's vibratory drum. A ratio of amplitude of first harmonics over the amplitude of the base frequency is used. A third example, called total applied force (TAF) uses real time measurement of the dynamic acceleration of the drum and eccentric position. Force is calculated at the drum/ground interface. The amplitude of TAF is used to indicate compaction density. Other methods could include using machine operation parameters to indicate stiffness of the soil. Water trucks may be dispatched to aide in compaction operations. Individual segment performance information would provide actionable information to the operator and would inform him/her of the segment impact on the task schedule and the project schedule.

Spreading or rough grading is accomplished by a wheel tractor scraper (WTS), a TTT or an AT. Performance can be defined as an area or volume that material is spread over. Segments 230 can be defined as areas or sub-areas. In some applications, a GPS-based automatic grading system such as Caterpillar Accugrade can be used. Individual segment performance information would provide actionable information to the operator and would inform him/her of the segment impact on the task schedule and the project schedule.

Finish grading is typically performed by a motor grader (MG) or a TTT. A performance indicator 200 may show the final design terrain vs. the current terrain. The finishing sub grade is the final surface provided by the MG and represent the finished surface for the entire system. Cycle times may be defined as target start and finish times for a given area. Individual segment performance information would provide actionable information to the operator and would inform him/her of the segment impact on the task schedule and the project schedule.

There is a need to provide contextual performance information to an operator and site supervisor. The operator needs actionable information, not just data. The bar graphs, pie charts, and trend lines that are typically supplied in productivity dashboards do not give actionable information to the operator. There is a need for the operator to know if they can be doing better, how they are performing in relation to their average performance, and how they are doing compared to other operators.

Figure 9:
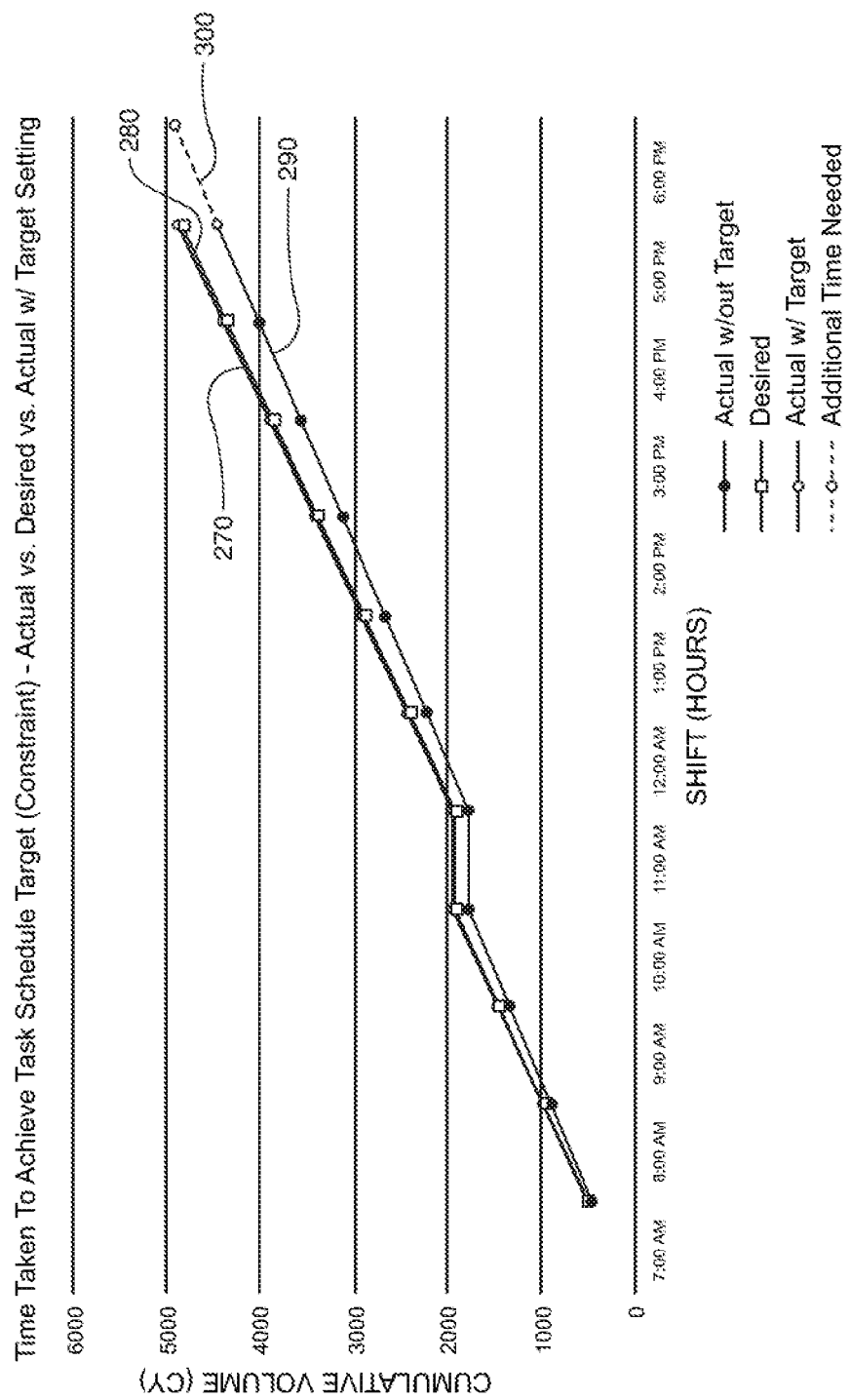
FIG. 9 is a chart showing actual vs. desired task schedule progress if targets are provided.

FIG. 9 shows a machine cycle broken down into segments 230. An operational level task 190 is highlighted on the list. A performance indicator 200 is shown to provide actionable information to the operator. In the load/haul/dump segment that is shown, the current performance indicator 220 is shown outside the optimum range 210 which shows the operator that he/she needs to improve cycle times in order to meet individual, shift, and project goals. A project impact indicator 240 may be shown if the cycle times impact the task schedule or project schedule beyond a predefined threshold. Providing this information to the operator will help the site supervisor and customer to realize the full benefit of the integrated earthmoving control system as disclosed.

For example, FIG. 7 shows simulated data for a task schedule over a single shift. The Desired trend line 270 shows desired productivity. This is the data provided by the simulated operations and/or the updated process variables. A second trend line called Actual With Targets 280 shows how actual progress follows closely to the Desired trend line 270 if the operator is provided with a performance indicator 200. A third trend line called Actual Without Targets 290 shows how progress can lag if the operator is not provided with a performance indicator 200. A segment called Additional Time 300 is shown to indicate how much additional time is needed to reach the shift goal if the operator is not provided a performance indicator 200.

The task schedule is a list or collection of tasks that is sorted in the order in which they are to be performed. The task schedule may include types of resources (such as machines) and a scheduled time for the task to be performed. The process variables 170 may also include the types of machines needed to perform the simulated operations at the worksite 10. For example, an output of the simulation may indicate that three excavators, eight hauling units, two track-type tractors, two wheel-tractor scrapers, two motor graders, and forty units of skilled labor will be required to perform the required operations at the worksite 10. The types of resource may also be broken down to specific types of model (i.e. eight 320 excavators, one each of D5k and D6N track-type tractors, etc.).

In the exemplary worksite 10, the one or more operations may include cutting operation and filling operation. The control system 16 may simulate the cutting operation and the filling operation based on the pre-construction terrain data 100 and the resource data 120. The control system 16 may receive the pre-construction terrain data 100 and the resource data 120 corresponding to the cutting operation and the filling operations from the databases and the user interface module 150. Based on the simulation, the control system 16 estimates the process variables 170 and the schedule of one or more tasks. Further, the simulation also generates information required to coordinate the machines 12 such as the excavators, wheel loaders, the track-type loaders, and the shovels with the mining trucks, the haul trucks, the on-highway trucks for performing the cutting operation, and the filling operation.

The machines 12 deployed in the worksite 10 are enabled to determine the location of each other for completing the one or more operations. The machines 12 may be equipped with a location tracking device such as a GPS or GNSS device. An operator of the machine 12 may control the movement of the machine based on the determined locations. For instance, for completing the cutting operation and the filling operation, the truck communicates with digging machines to identify the GPS co-ordinates of the digging machines to determine the location of the digging machines. Further, the truck receives a new load and travels to a dump location via a hauling route.

The machines 12 may include hardware components and/or software components that determine and use locations of each other to coordinate operations and to control machine tasks. In another aspect of the current disclosure, the machine 12 may be configured to be operated from a remote location by the operator. Control commands may be issued over communication medium 14 or any other suitable communication network as is known in the art. Further, the machine 12 may be configured to operate autonomously according to a set of instructions. The set of instructions may be located on a controller onboard the machine 12, a neighboring machine 12, or may be issued by the control system 16 over the communication medium 14.

The control system 16 is also implemented at the execution phase of the one or more operations at the worksite 10. During the execution phase, the control system 16 monitors a progress of the one or more operations at the worksite 10. At a block 26, the control system 16 collects real time data from the worksite 10 during the execution phase. The real time data collected from the worksite 10 may include, but is not limited to, an amount of material transferred at the worksite 10, performance details of each of the machines 12 deployed at the worksite 10, operator inputs, information on productivity of the skilled labor 130, and data obtained from a worksite survey. The control system 16 may collect the real time data via the communication medium 14. The real time data may be used to define a current terrain model 124.

In one example, the control system 16 may collect data directly from the machines 12 deployed at the worksite 10 via the communication medium 14. In another example, the machines 12 deployed at the worksite 10 may be communicated to multiple source systems (not shown) such as terrain management system and fleet management system. The source systems may collect the data of the machines 12 and store in a data warehouse (not shown). The data warehouse is in communication with the source systems. The control system 16 may collect the real time data of the machines 12 from the data warehouse. The control system 16 collects operator inputs via the user interface module 150 connected to the control system 16. An operator of the machines 12 may be enabled to provide the real time data of the worksite 10 to the control system 16 using the GUI of the user interface module 150.

Some of the real time data collected in the data warehouse may need preparation to be utilized by the simulation in the execution phase. Data preparation could include, but is not limited to; data cleansing to improve data accuracy and correct data discrepancies, data conversion to transform the real time data to be compatible in form and content with the original worksite and the resource data 120 and to provide improved site-specific data for the simulation in the execution phase. Data analytics and pre-simulation models may be used to cleanse and convert the real time data in the data warehouse.

In execution phase, the one or more operations at the worksite 10 are simulated by the control system 16 upon receiving the real time data, at the block 22. The simulation of the one or more operations during the execution phase is performed based on the real time data received at the block 26, the pre-construction terrain data 100 received at the block 18, the design terrain data 110 received at the block 19, and the resource data 120 received at the block 20.

At a block 28, the control system 16 updates the process variables 170 associated with the one or more operations estimated during the planning phase based on the real time data. The control system 16 updates the process variables 170 based on the simulation of the one or more operations at the execution phase. The updated process variables 170 may include, but is not limited to, a revised cost of the one or more operations, a revised time required for the one or more operations, and revised type and number of the machines 12 required for performing the one or more operations. The control system 16 also updates the identified and scheduled one or more tasks of the machines 12 based on the simulation of the one or more operations performed at the block 26. The control system 16 also generates a progress report of the one or more operations performed at the worksite 10 based on the real time data and the simulation of the one or more operations. The control system 16 may also generate a three dimensional model of the worksite 10 based on the real time data received from the worksite 10 via the user interface module 150. For example, if the machines 12 are deployed in a construction site, then the three dimensional model of the worksite 10 may be a built model of a building to be constructed at the construction site. The task and schedule updates generated by the simulation may be reviewed and modified by a site supervisor or work director and input using the user interface module 150. These modifications are used as new input data for the off-board system to update the simulation tasks and schedule. The updated process variables 170 are provided to the user interface module 150 for assessment.

In one example, based on the simulation of the one or more operations during the execution phase, a difference between the estimated process variables 170 at the execution phase and estimated process variables 170 at the planning phase are computed. The computed difference is added to the estimated process variables 170 to determine the updated process variables 170.

The control system 16 is exemplary and should not limit the scope of the present disclosure. The functionality of the control system 16 described herein is also exemplary. The control system 16 may additionally include other components and capabilities not described herein. The worksite 10 may additionally include any number of the control system 16. The machines 12 may include a portion the control system 16 to coordinate work tasks for their portion of the site operations. Further, architecture and capabilities of the control system 16 may vary without any limitation.

Figure 3:
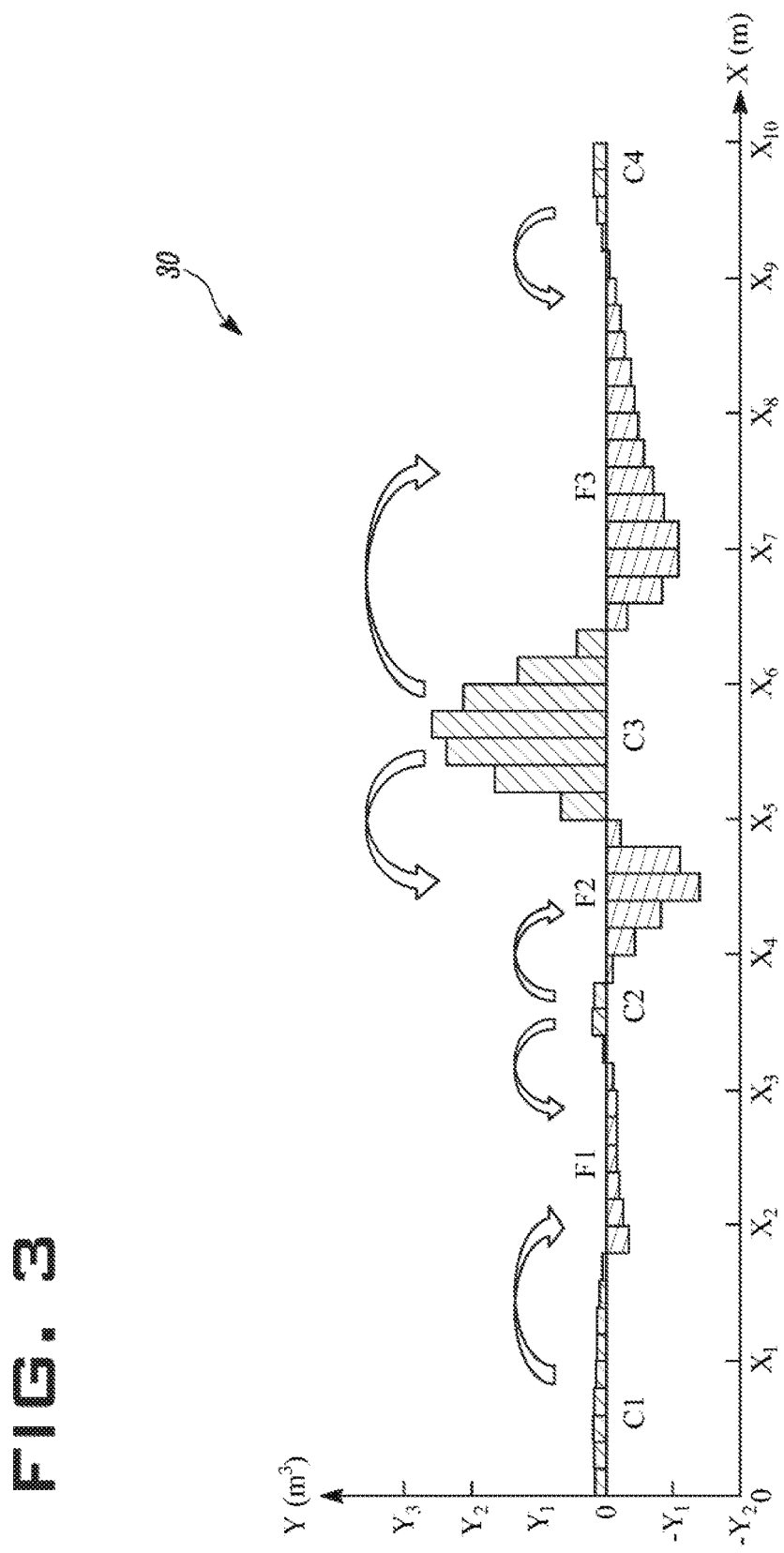
FIG. 3 is a graphical representation showing scheduling of one or more tasks of the one or more machines for an exemplary earth moving operation at the worksite.

FIG. 3 is a graphical representation 30 showing scheduling of the one or more tasks of the machines 12 for an exemplary earth moving operation at the worksite 10. The earth moving operation shown in the graphical representation 30 includes the cutting operation and the filling operation. A length of the worksite 10 in meters (m) and a volume of material 180 to be cut and filled at the worksite 10 in m³ are plotted along an X-axis and a Y-axis, respectively. As illustrated in the FIG. 3, the worksite 10 includes multiple cut locations and multiple fill locations. A required level of the worksite 10 may be indicated at "0" in the Y axis. Material from a cut location 'C1' may be removed and filled at a fill location 'F1'. Material from a cut location 'C2' is removed and filled at fill locations 'F1' and 'F2'. Similarly, material from a cut location 'C3' is removed and filled at fill locations 'F2' and 'F3'. Material from a cut location 'C4' is removed and filled at the fill location 'F3'. The control system 16 selects an optimum operating path for multiple trucks employed at the worksite 10 for performing the cut operation and the fill operation as indicated in the graphical representation 30.

FIG. 5 is an exemplary table 32 representing process variables 170 associated with the one or one or more operations. The process variables 170 are estimated and tabulated for an exemplary cut and fill operation by the control system 16. The process variables 170 may include, but is not limited to, the operation path of the machines 12 at the worksite 10 named as route name, a source station, a destination station, multiple machine specifications, a hauling distance, volume of material 180, a unit cost associated with the operating path between the source station and the destination station, a hourly productivity, total working hours, and fuel usage. In one example, for a selected operating path 27-22, the source station may be a station number 27 and the destination station may be a station number 22. The hauling distance corresponding to the operating path 27-22 may be 100 meters. The volume of material 180 transferred at the operating path 27-22 may be 1330 cubic meters. The hourly productivity of the operating path 27-22 may be 336. 61. The fuel usage of the machines 12 for the operating path 27-22 may be 69.65 Gallons.

In another embodiment, the machines 12 deployed on the worksites 10 may also include autonomous machines (not shown) and/or semi-autonomous machines (not shown). In such scenarios, the control system 16 may be implemented in the planning phase and the execution phase of the one or more operations to be performed at the worksite 10 as explained earlier. The autonomous machines may be in communication with the control system 16. The autonomous machines may include hardware components and/or software components that enable sending of data between the autonomous machines and the control system 16. The autonomous machines receive instructions from the control system 16. These instructions may include specific machine command and control software applications to be downloaded to the machine prior to or during the execution phase. The movement and/or operation of the autonomous machines may also be regulated based on instructions from the control system 16 during the execution phase.

INDUSTRIAL APPLICABILITY

The control system 16 described in the present disclosure may be implemented in the planning phase and the execution phase of the one or more operations such as, but is not limited to, cutting operation, filling operation, construction works, quarrying, and mining operations performed at the worksite 10. The control system 16 identifies and schedules the one or more task to be performed by the machines 12. The scheduling of the one or more task of the machines 12 enables efficient implementation of the one or more operations at the worksite 10. Further, during the execution phase of the one or operations at the worksite 10, the control system 16 is in real time communication with the machines 12 deployed at the worksite 10. This enables the control system 16 to retrieve real time data from the machines 12. The real time data allows monitoring of a progress of the one or more operations at the worksite 10 efficiently. Further, the real time data is used for updating the process variables 170 and scheduling the one or more tasks of the machines 12. The turn around time of the one or more operations is reduced when the process variables 170 and the one or more tasks are updated in real time.

Figure 6:
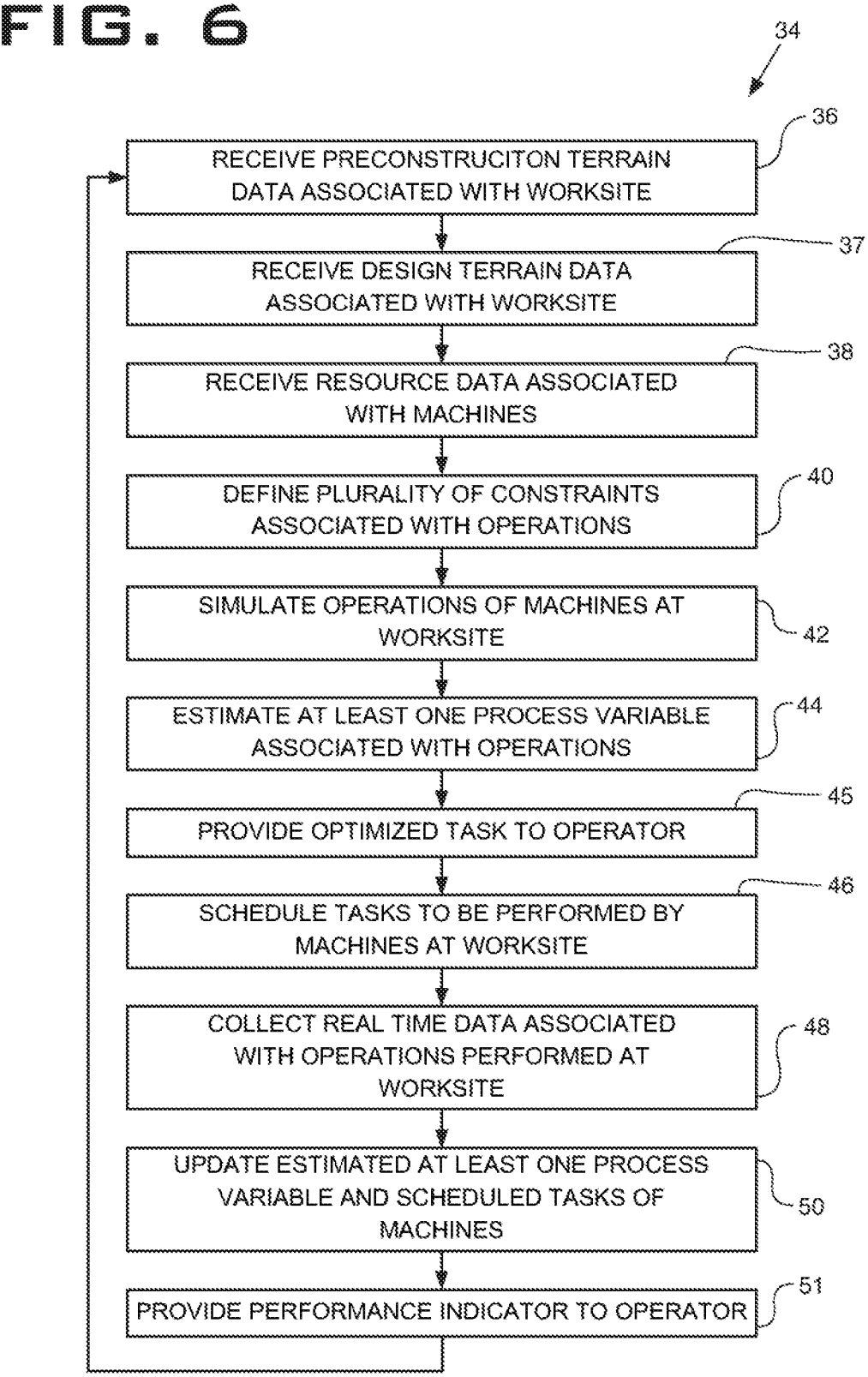
FIG. 6 is a flow chart of a method of controlling the one or more machines for performing the one or more operations at the worksite

For the first time all earthmoving phases of a construction process have been vertically integrated. In previous practice, there could be a substantial time delay between the survey, planning, and execution phases of a construction project. Previous practice also resulted in lack of information on actual machine performance data and project phase progress. If there was an error between expected machine performance or schedule progress, the information might be available too late to take steps to control the error. In the control system according to the instant application, the progress of the schedule and phases of the entire construction project can be communicated in real time or near real time. Planners will be able to see the impact of unforeseen influences on the task schedule and project schedule. Supervisors will be able to see if an operator or a group of operators (i.e. a shift) is deviating from the planned task schedule and project schedule in time to add or reassign resources. Operators will be able to see the impact of machine cycle times or segments 230 of cycle times on the task schedule or project schedule and improve their performance before the task schedule or project schedule is negatively impacted. FIG. 6 is a flow chart of a method 34 of controlling the machines 12 for performing the one or more operations at the worksite 10. At step 36, the control system 16 receives the data associated with the worksite 10. At step 38, the control system 16 receives the resource data 120 associated with the machines 12. At step 40, the control system 16 defines the plurality of constraints 160 associated with the one or more operations based on the data and the resource data 120. At step 42, the control system 16 simulates the one or more operations of the machines 12 at the worksite 10 based on the data and the resource data 120. Based on the simulation and the plurality of constraints 160, the control system 16 estimates the process variables 170 associated with the one or more operations at step 44. At step 45, the control system 16 provides an optimized task to the operator. The control system 16 also schedules one or more tasks to be performed by the machines 12 at the worksite 10, based on the simulation of the one or more operations at step 46. At step 48, the control system 16 collects the real time data associated with the one or more operations performed at the worksite 10 using the communication medium 14. Further, at step 50, the control system 16 updates the estimated process variables 170 associated with the one or more operations and the scheduled one or more tasks of the machines 12 based on the collected real time data. At step 51, the control system 16 provides a performance indicator to the operator.

What is claimed is:

1. A method of operations of machines at a worksite, the method comprising:
    receiving, by a control system, pre-construction terrain data associated with the worksite;
    receiving, by the control system, design terrain data associated with the worksite;
    receiving, by the control system, resource data associated with the machines;
    defining a plurality of constraints associated with the operations based on the pre-construction terrain data, the design terrain data, and the resource data;
    simulating the operations of the machines at the worksite based on the pre-construction terrain data, the design terrain data, and the resource data;
    estimating process variables associated with the operations based on the simulation of the operations and the plurality of constraints;
    providing an optimized operational level task to an operator of a machine based on the estimated process variables;
    collecting real time data associated with the operations performed at the worksite using a communication medium;
    updating the estimated process variables associated with the operations of the machines based on the collected real time data; and
    providing a performance indicator to the operator based on the optimized task and the real time data.

2. The method of claim 1, wherein the process variables include tasks, task schedule, and required resources.

3. The method of claim 1, wherein the operational level task includes a target cycle time and the performance indicator includes an indication of a measured cycle time relative to the target cycle time.

4. The method of claim 1, wherein the operations include one of digging, hauling, loading, compaction, spreading, or grading.

5. The method of claim 1, wherein the operational level task includes a target hauling cycle time and the performance indicator includes an indication of a measured hauling cycle time relative to the target hauling cycle time.

6. The method of claim 1, wherein the operational level task includes a target loading cycle time and the performance indicator includes an indication of a measured loading cycle time relative to the target loading cycle time.

7. The method of claim 1, wherein the operational level task includes a target digging cycle time and the performance indicator includes an indication of a measured digging cycle time relative to the target digging cycle time.

8. The method of claim 1, wherein the operational level task includes a target compaction level and the performance indicator includes an indication of a measured compaction level relative to the target compaction level.

9. The method of claim 3, wherein a project impact indicator is provided showing the impact of cycle times on the project schedule.

10. The method of claim 1, wherein the project impact indicator is provided to a back office.

11. A system for operations of machines at a worksite, the system comprising:
    a control system configured to:
        receive said pre-construction terrain data from a database;
        receive said design terrain data from a database;
        receive resource data from a database;
        define a plurality of constraints associated with the operations based on the pre-construction terrain data, the design terrain data, and the resource data;
        simulate the operations of the machines at the worksite based on the pre-construction terrain data, the design terrain data, and the resource data;
        estimate process variables associated with the operations based on the simulation of the operations and the plurality of constraints;
        provide an optimized operational level task to an operator of a machine based on the estimated process variables;
        collect real time data associated with the operations performed at the worksite using a communication medium;
        update the estimated process variables associated with the operations of the machines based on the collected real time data; and
        provide a performance indicator to the operator based on the optimized task and the real time data.

12. The system of claim 11, wherein the process variables include tasks, task schedule, and required resources.

13. The system of claim 11, wherein the operational level task includes a target cycle time and the performance indicator includes an indication of a measured cycle time relative to the target cycle time.

14. The system of claim 11, wherein the operations include one of digging, hauling, loading, compaction, spreading, or grading.

15. The system of claim 11, wherein the operational level task includes a target hauling cycle time and the performance indicator includes an indication of a measured hauling cycle time relative to the target hauling cycle time.

16. The system of claim 11, wherein the operational level task includes a target loading cycle time and the performance indicator includes an indication of a measured loading cycle time relative to the target loading cycle time.

17. The system of claim 11, wherein the operational level task includes a target digging cycle time and the performance indicator includes an indication of a measured digging cycle time relative to the target digging cycle time.

18. The system of claim 11, wherein the operational level task includes a target compaction level and the performance indicator includes an indication of a measured compaction cycle time relative to the target compaction cycle.

19. The system of claim 13, wherein a project impact indicator is provided showing the impact of cycle times on the project schedule.

20. The system of claim 11, wherein the project impact indicator is provided to a back office.

* * * * *